United States Patent
Lin et al.

(10) Patent No.: US 11,431,268 B2
(45) Date of Patent: Aug. 30, 2022

(54) MOTOR DRIVING SYSTEM AND MOTOR DRIVING METHOD

(71) Applicant: DELTA ELECTRONICS, INC., Taoyuan (TW)

(72) Inventors: Cheng-Yun Lin, Taoyuan (TW); Chia-Wei Chou, Taoyuan (TW); Chen-Hsiang Kuo, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/317,847

(22) Filed: May 11, 2021

(65) Prior Publication Data
US 2022/0069744 A1  Mar. 3, 2022

(30) Foreign Application Priority Data

Aug. 31, 2020  (CN) .......................... 202010894418.7

(51) Int. Cl.
*H02P 5/50* (2016.01)
*H02P 3/20* (2006.01)

(52) U.S. Cl.
CPC . *H02P 5/50* (2013.01); *H02P 3/20* (2013.01)

(58) Field of Classification Search
CPC ..................................... H02P 5/50; H02P 3/20
See application file for complete search history.

(56) References Cited

U.S. PATENT DOCUMENTS

| 5,196,769 A * | 3/1993 | Chiba ................... H02P 29/025 318/41 |
| 6,684,788 B2 * | 2/2004 | Ohno .................. B41F 13/0045 318/700 |
| 7,174,731 B2 * | 2/2007 | Okano ...................... H02P 6/04 318/67 |
| 8,701,808 B2 | 4/2014 | Zhu et al. |
| 2005/0115256 A1 * | 6/2005 | Okano ...................... H02P 5/00 318/67 |
| 2011/0107931 A1 * | 5/2011 | Haaf .................. B41F 33/0018 101/232 |
| 2015/0188478 A1 * | 7/2015 | Saeki .................... H02M 5/458 318/812 |

(Continued)

FOREIGN PATENT DOCUMENTS

| CN | 1970858 A | 5/2007 |
| CN | 104218852 A | 12/2014 |
| CN | 104365007 A | 2/2015 |

(Continued)

*Primary Examiner* — Muhammad S Islam
*Assistant Examiner* — Devon A Joseph
(74) *Attorney, Agent, or Firm* — CKC & Partners Co., LLC

(57) ABSTRACT

A motor driving system includes a controller, motors and motor drivers. In the normal supplying state of a power supply, the controller controls the motor drivers. The motor drivers output driving signals for driving the motors respectively. In an abnormal state or a power-off state of the power supply, one of the motor drivers is set to be a master driver and the others are set to be slave driver. The master driver activates a deceleration energy backup (DEB) function, powers the slave drivers through a common-DC-bus structure, controls the slave drivers, and during deceleration maintains a ratio between frequencies of the driving signals, until all of the motors are decelerated to stop at the same time.

9 Claims, 5 Drawing Sheets

(56) References Cited

U.S. PATENT DOCUMENTS

2015/0244291 A1* 8/2015 Chen .................... H02P 3/14
                                                                                       318/703
2018/0342964 A1* 11/2018 Debuf .................. H02P 29/025

FOREIGN PATENT DOCUMENTS

| CN | 104753407 A | 7/2015 |
| CN | 104868798 A | 8/2015 |
| CN | 104868798 B | 6/2017 |
| TW | 201933754 A | 8/2019 |

\* cited by examiner

MOTOR DRIVING SYSTEM AND MOTOR DRIVING METHOD

RELATED APPLICATIONS

This application claims priority to China Application Serial Number 202010894418.7 filed Aug. 31, 2020, which is herein incorporated by reference.

BACKGROUND

Field of Invention

The present disclosure relates to a motor driving system including motors and motor drivers. The technology of this disclosure can maintain the frequencies of driving signals outputted by the motor drivers at a certain value when a power supply is abnormal, so that the motors can be decelerated to stop at the same time.

Description of Related Art

Equipment for processing silk thread in the textile industry usually includes a spindle, a winding machine and a wire. The spindle is used to control a releasing speed of raw material onto the wire, and the winding machine is used to receive the wire. In order to meet the requirement of twist and characteristics of the processed material, the speeds of the spindle and the winding machine need to match at a particular ratio which is easily achieved in general operating conditions. However, when the equipment is power off or abnormally unstable, the spindle and the winding machine will stop freely due to the loss of power. The twist may not be correct or a yarn may be knotted if the spindle and the winding machine do not stop at the same time. It is an issue in the related technical field about how to stop the spindle and the winding machine at the same time when the equipment is power off or abnormal while a ratio between frequencies of driving signals is maintained so that motors are decelerated to stop at the same time.

SUMMARY

Embodiments of the present disclosure provide a motor driving system including a controller, a plurality of motors, and a plurality of motor drivers. The motor drivers are electrically connected to the motors and output driving signals to drive the motors correspondingly and respectively. The motor drivers form a common-DC-bus structure. When a power supply is in a normal supplying state, the controller controls the motor drivers. When the power supply is in an abnormal state or a power-off state, one of the motor drivers is set to be a master driver and the others are set to be slave drivers. The master driver activates a deceleration energy backup function to power and control the slave drivers through the common-DC-bus structure and maintains a ratio between frequencies of the driving signals during deceleration until the motors are decelerated to stop at the same time.

From another aspect, embodiments of the present disclosure provide a motor driving method for a motor driving system including a plurality of motors and a plurality of motor drivers. The motor driving method includes: performing an power-on operation; determining if a power supply is in an abnormal state or a power-off state; setting one of the motor drivers to be a master driver and the others to be slave drivers when determining that the power supply is in the abnormal state or the power-off state; activating, by the master driver, a deceleration energy backup function to power and control the slave drivers through a common-DC-bus structure; and outputting, by the motor drivers, a plurality of driving signals to control the motors correspondingly and respectively, wherein a ratio of frequencies between the driving signals is maintained during deceleration until the motors are decelerated to stop at the same time.

In the motor driving method and system, the ratio of the frequencies of the driving signals outputted by the motor drivers is maintained at a certain vale when the motor driving system is in the abnormal state. Therefore, the motors follow the driving signals to be decelerated until they stop at the same time. This can avoid the damage of the motors or equipment.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
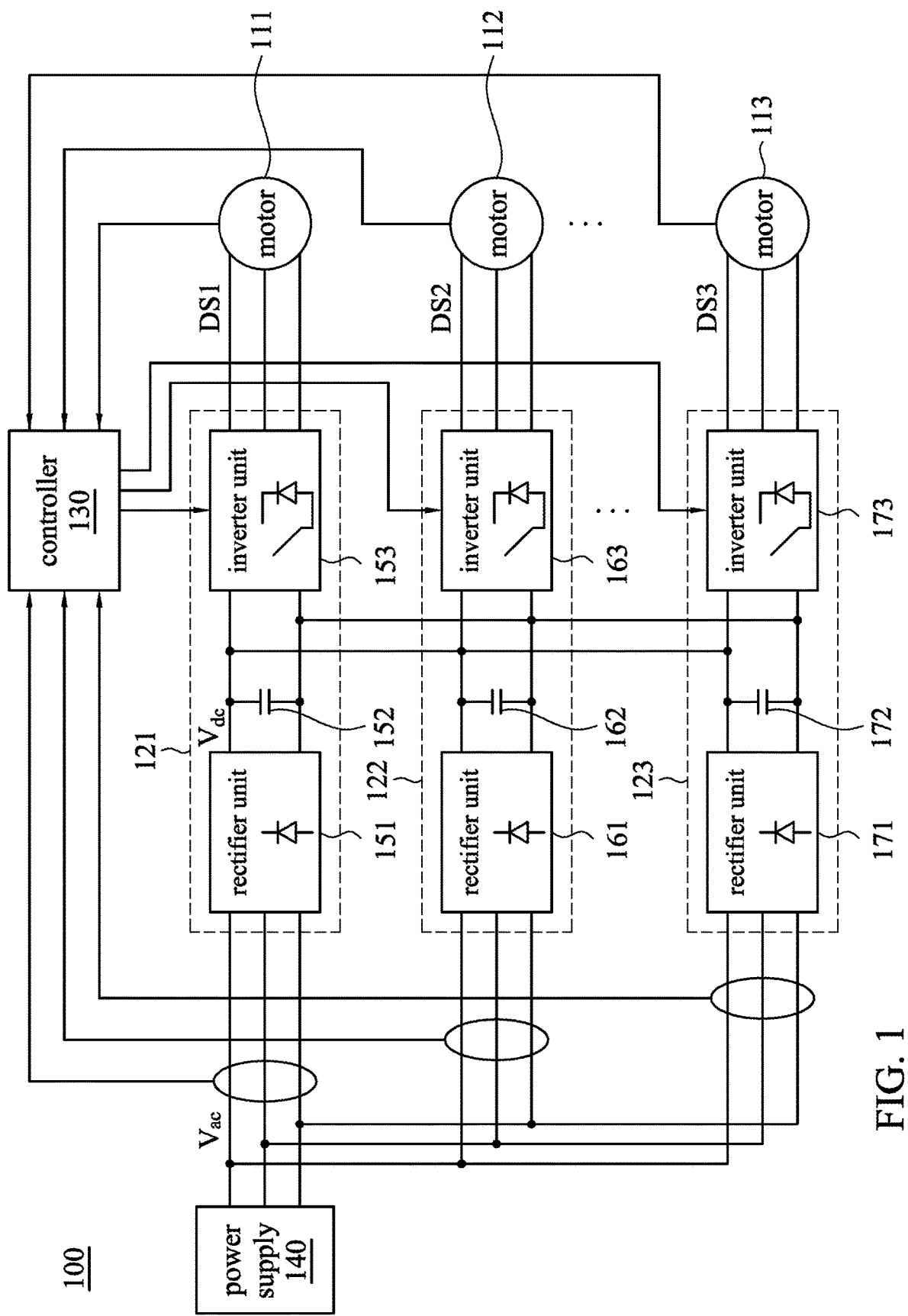
FIG. 1 is a schematic diagram of a motor driving system in accordance with an embodiment.

FIG. 1 is a schematic diagram of a motor driving system in accordance with an embodiment. Referring to FIG. 1, a motor driving system 100 includes multiple motors, multiple motor drivers, and a controller 130. The multiple motors such as a first motor 111, a second motor 112 and a third motor 113 are, for example but not limited to, three-phase induction motors (IM) or three-phase permanent magnet synchronous motors (PMSM). The multiple motor drivers includes, for example, a first motor driver 121, a second motor driver 122 and a third motor driver 123. The first motor driver 121 includes a rectifier unit 151, an energy storage unit 152 and an inverter unit 153. The second motor driver 122 includes a rectifier unit 161, an energy storage unit 162 and an inverter unit 163. The third motor driver 123 includes a rectifier unit 171, an energy storage unit 172 and an inverter unit 173. The rectifier units 151, 161 and 171 (may be referred to rectifying circuits) are, for example, AC/DC converters such as bridge rectifiers. The energy storage units 152, 162 and 172 are, for example, capacitors. The inverter units 153, 163 and 173 are, for example, DC/AC inverters including insulate-gate bipolar transistors (IGBT) or other types of power transistors. Note all units of the multiple motor drivers 121-123 are shown in FIG. 1 for simplification. For example, each of the multiple motor drivers 121-123 may further include a micro controller or other circuits for the need of controlling and calculation.

An external power supply 140 is, for example, a three-phase AC power supply such as supply mains for powering the controller 130 and the multiple motor drivers 121-123. An input side of the rectifier unit 151 of the first motor driver 121 receives an AC voltage $V_{ac}$ provided from the power supply 140. An output side of the rectifier unit 151 is electrically connected to the energy storage unit 152 for transforming the AC voltage $V_{ac}$ into a DC voltage $V_{dc}$ to charge the energy storage unit 152 into saturation for providing stable DC voltage $V_{dc}$. An input side of the inverter unit 153 is electrically connected to the energy storage unit 152. An output side of the inverter unit 153 is electrically connected to the first motor 111. The inverter unit 153 is configured to convert the DC voltage $V_{dc}$ of the energy storage unit 152 into an AC voltage which is outputted as a first driving signal DS1 to drive the corresponding first motor 111 and control speed of the first motor 111 which follows the first driving signal DS1. Similarly, the inverter unit 163 of the second motor driver 122 outputs a second driving signal DS2 to drive the second motor 112 and control speed of the second motor 112, and the inverter unit 173 of the third motor driver 123 outputs a third driving signal DS3 to drive the third motor 113 and control speed of the third motor 113.

In the embodiment of FIG. 1, the multiple motor drivers 121-123 form a common-DC-bus structure. In other words, a DC bus bar of the first motor driver 121 is electrically connected to DC bus bars of the second motor driver 122 and the third motor driver 123.

The controller 130 can be implemented as hardware, software, firmware or the combination thereof. The controller 130 is electrically connected to the inverter units 153, 163 and 173. The controller 130 can turn on/off transistor switches of the inverter units 153, 163 and 173 by technology of pulse width modulation (PWM) so as to control frequencies and amplitudes of the driving signals DS1-DS3. The controller 130 can be a high-level device that is mainly composed of programmable logic controller (PLC). The frequencies of the driving signals DS1-DS3 affect the rotation speeds of the motors 111-113 respectively. The higher the frequencies of the driving signals DS1-DS3 are, the higher the rotation speeds of the motors 111-113 are. In addition, when the rotation speeds of the motors 111-113 is decreased, the motors 111-113 serve as generators to produce electrical energy. Take the first motor 111 as an example, when the first motor driver 121 decreases the frequency of the first driving signal DS1 for reducing the rotation speed of the first motor 111, the first motor 111 is transformed into a generator mode to convert its own kinetic energy into electrical energy which is transmitted back to the energy storage unit 152 through the inverter unit 153 of the master driver 141. Accordingly, the DC voltage $V_{dc}$ of the energy storage unit 152 is increased. When the electrical energy stored in the energy storage unit 152 is consumed, the DC voltage $V_{dc}$ of the energy storage unit 152 is reduced, and then the first master driver 121 can decrease the frequency of the first driving signal DS1 again to control the first motor 111 to be transformed into the generator mode for continuously generating electricity and slowing down. This operation can be repeated until the first motor 111 is decelerated to stop. This approach can consume the kinetic energy of the first motor 111 faster, and provide electrical energy to the first motor driver 121 when the power supply 140 is abnormal or power off, so that the first motor 111 is controlled to stop faster. In addition, the electrical energy stored in the energy storage unit 152 can also be provided to the second motor driver 122 and the third motor driver 123 through the common-DC-bus structure. The aforementioned technical means of converting kinetic energy of the motor into electrical energy is called a deceleration energy backup (DEB) function. Anyone of the motor drivers 121-123 can selectively activate or disable the DEB function. On the other hand, the motors 111-113 also transmit information such as rotation speed and current amplitude of itself to the motor drivers 121-123 or the controller 130.

The controller 130 can obtain a voltage value of the AC voltage $V_{ac}$ through one or multiple sensors, or one of the motor drivers 121-123 can obtain this information to determine if the power supply 140 is normal or stable. If the power supply 140 is normal or stable, it is determined that the motor driving system 100 is in a normal supplying state, and then the controller 130 will control the inverter units 153, 163 and 173 of the motor drivers 121-123 to output the driving signals DS1-DS3 such that the ratio between the frequencies of the first driving signal DS1 and the second driving signal DS2 is maintained at a first ratio, and the ratio between the frequencies of the first driving signal DS1 and the third driving signal DS3 is maintained at a second ratio which may be identical to or different from the first ratio. In contrast, if the power supply 140 is abnormal, power off or unstable, it is determined that the motor driving system 100 is in an abnormal state or a power-off state, and in this case the motor drivers 121-123 will coordinate with each other to set one of the motor drivers 121-123 to be a master driver and others to be slave drivers. Since the power supply 140 is determined to be in the abnormal state, it cannot supply power, and therefore the master driver activates the DEB function of itself to supply power to the slave drivers through the common-DC-bus structure, and the slave drivers are controlled by the master driver. In the braking process, the master driver controls itself and the slave drivers based on the DC voltage $V_{dc}$ to output the driving signals DS1-DS3 such that the ratio between the first driving signal DS1 and the second driving signal DS2 is maintained at the first ratio, and the ratio between the frequencies of the first driving signal DS1 and the third driving signal DS3 is maintained at the second ratio until all of the motors 111-113 follow the driving signals DS1-DS3 to be decelerated and stop at the same time. Note that the driving signals DS2 and DS3 may be set such that the ratio between frequencies of the second driving signal DS2 and the third driving signal DS3 is maintained at a third ratio. In other words, if the ratio between the frequencies of the driving signals of any two of motor drivers is maintained at a certain value, it is in the scope of the disclosure. The embodiments can be modified according to requirements.

Figure 2:
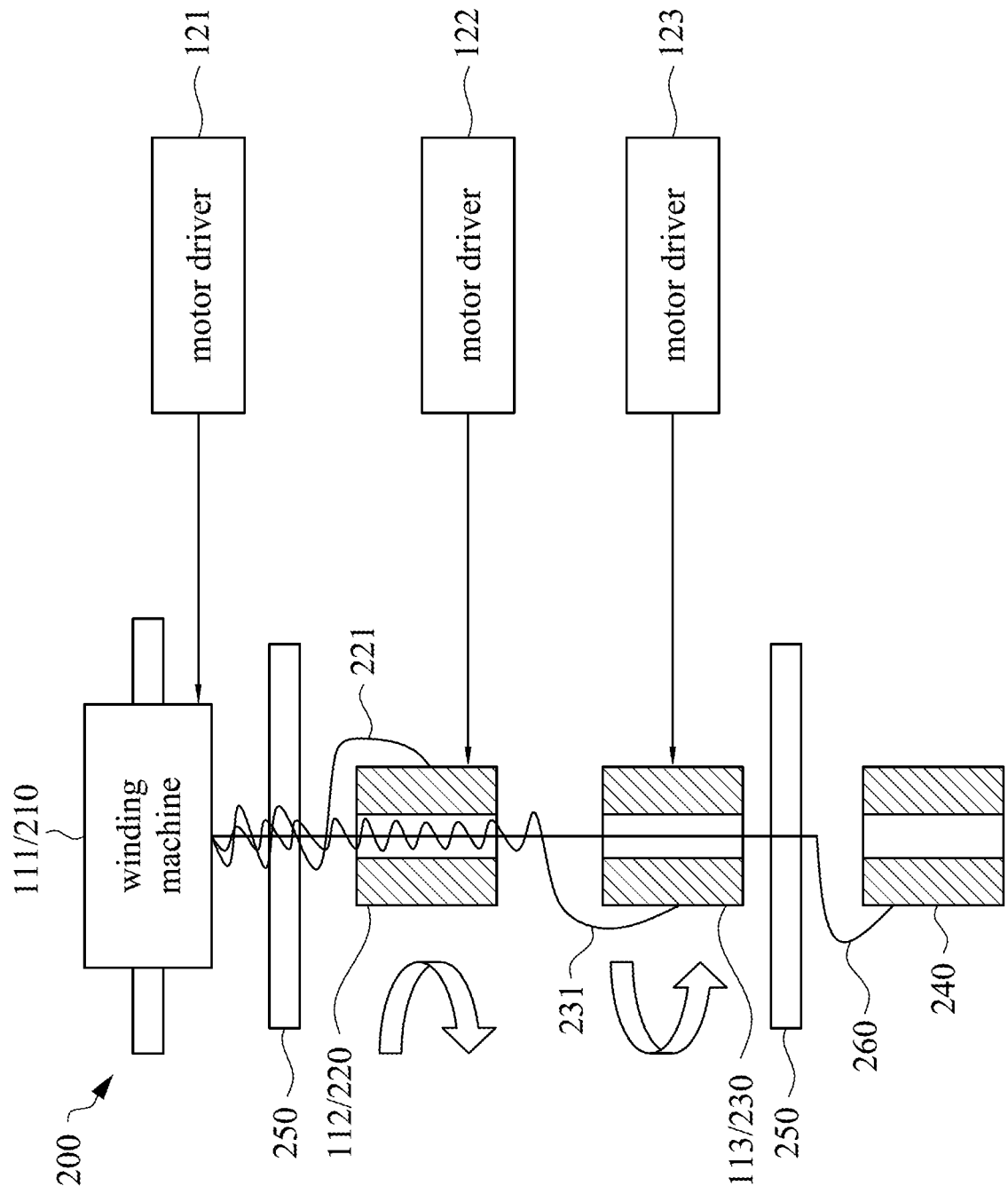
FIG. 2 is a schematic diagram of applying the motor driving system to a textile machine in accordance with an embodiment.

For example, FIG. 2 is a schematic diagram of applying the motor driving system to a textile machine in accordance with an embodiment. In the embodiment of FIG. 2, a textile machine 200 includes a winding machine 210, a first spindle 220, a second spindle 230, a covering yarn 240 and at least one roller 250. In the embodiment, the first motor 111 is applied to the winding machine 210, the second motor 112 is applied to the first spindle 220, and the third motor 113 is applied to the second spindle 230. The rotation axis of the winding machine 210 is perpendicular to that of the first spindle 220 and the second spindle 230. A wire 260 extracted from the covering yarn 240 passes through the second spindle 230 which is rotated by the third motor 113 to wrap a second thread 231 onto the wire 260. Similarly, the wire 260 passes through the first spindle 220 which rotated by the second motor 112 to wrap a first thread 221 onto the wire 260 and the second thread 231. The rotation speeds of the second motor 112 and third motor 113 respectively determines the twists of the first thread 221 and the second thread 231. The wire 260, the first thread 221, the second thread 231 are received by the winding machine 210 which is rotated by the first motor 111. The winding machine 210 is used to control the winding location of the yarn along a vertical direction. Two spindles 220 and 230 are used in the embodiment, but more or less spindles may be used in other embodiments while each spindle is matched with a motor. The ratios between the frequencies of the driving signals DS2 and DS3 and the frequency of the driving signal DS1 are maintained at particular values (e.g. 0.8:1 and 0.6:1) to control the twists.

The motor drivers 121-123 may be server drivers or inverters. In general, the server drives are more accurate than the inverters, but they are usually more expensive and have lower output power. Each server driver often includes an inverter. In contrast, the inverters are relatively less accurate, cheaper, and have higher output power. Users can adopt appropriate machine according to their need. In the embodiment of FIG. 2, the spindles 220 and 230 are heavier without the need of high accuracy, and therefore the second motor driver 122 and third motor driver 123 are the inverters. On the other hand, the winding machine 210 needs to arrange the wire tightly, and therefore the first motor driver 121 may be the server driver. However, people in the art should be able to select the server driver or the inverter as the motor drivers according to their need. The disclosure is not limited to the embodiment of FIG. 2.

When anyone of the motor drivers 121-123 servers as a detector for determining that the power supply 140 is in the abnormal state or the power-off state, the motor drivers 121-123 coordinate with each other to set one of them to be a master driver and the others to be slave drivers. In some embodiments, system inertia is considered. The system inertia may include, from the perspective of the motor driver, a rotational inertia of the driven motor and an inertial of a load connected to the corresponding motor. If not all of the rotational inertia of the motors 111-113 are completely identical to each other or not all of the inertial of the loads corresponding to the motors 111-113 are completely identical to each other, causing that not all of the system inertia are completely identical to equal to each other, then the motor driver corresponding to the maximum system inertia will be set to be the master driver because the motor with greater system inertia has relatively larger kinetic energy with the same rotation speed and thus can produce more electrical energy when the DEB function is activated. In the embodiment, the rotation inertia of the second motor 112 and third motor 113 is greater than that of the first motor 111, and the inertial of the loads (e.g. the threads 221 and 231) connected to the second motor 112 and third motor 113 are both greater than that of the load (e.g. the winding machine 210 and the weight of the thread) connected to the first motor 111. That is, the system inertial driven by the second motor driver 122 and the third motor driver 123 are greater than the system inertial driven by the first motor driver 121, and accordingly one of the second motor driver 122 and the third motor driver 123 is set to be the master driver. The unselected one and the first motor driver 121 are set to be the slave drivers.

Figure 3:
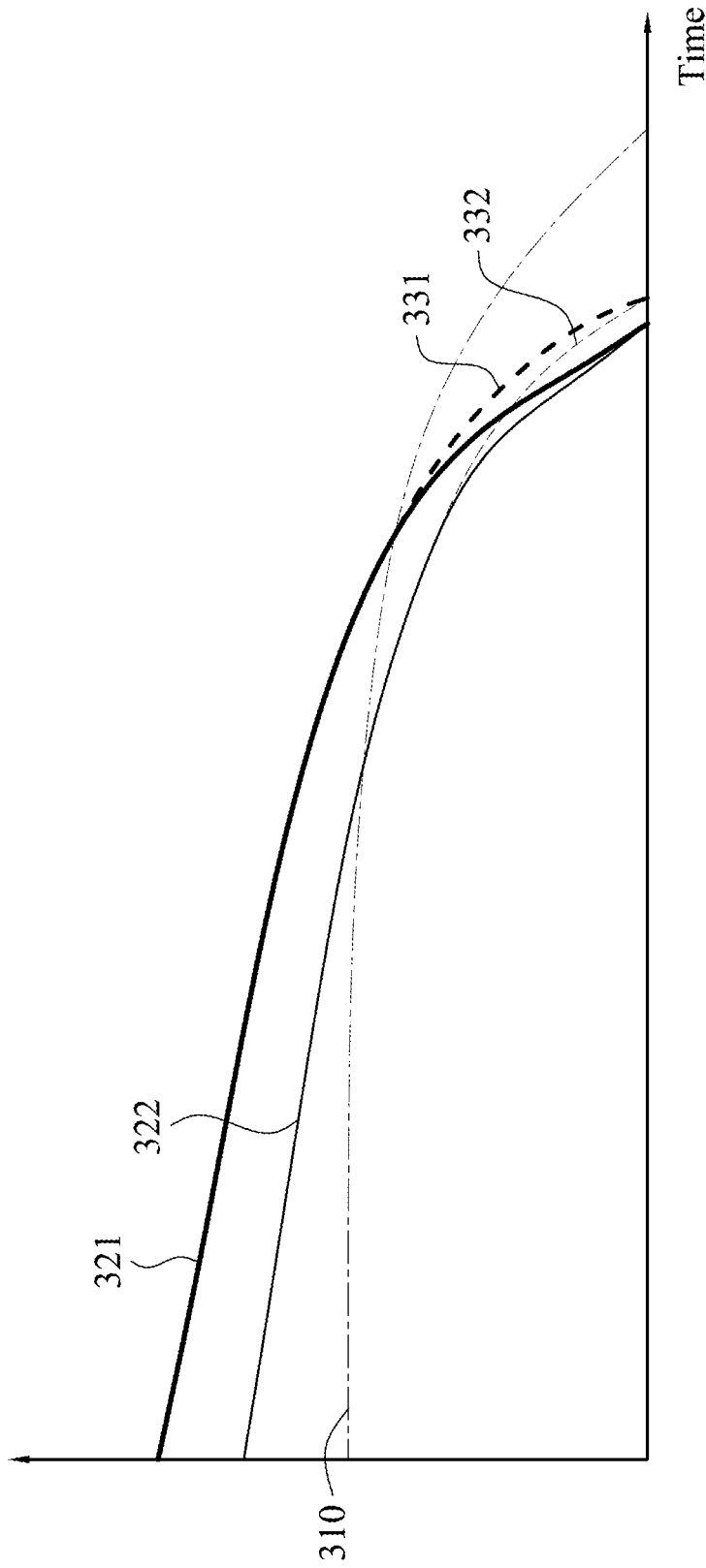
FIG. 3 is a diagram illustrating decreasing speeds of motors when the power supply is in an abnormal state in accordance with an embodiment.

FIG. 3 is a diagram illustrating decreasing speeds of motors when the power supply is in the abnormal state in accordance with an embodiment. One master driver with one slave driver are described herein for simplification, and the control of the other slave driver that is not described can be analogized. Referring to FIG. 1 and FIG. 3, a curve 310 represent a voltage value of the DC voltage $V_{dc}$ of the common-DC-bus structure. A curve 321 represents the frequency of the driving signal outputted by the master driver. A curve 322 represents the frequency of the driving signal outputted by the slave driver. It is shown that the ratio between the curve 321 and the curve 322 is maintained at a curtain value along the time axis, and the curve 322 follows the curve 321 to decrease together. In addition, a curve 331 represents the rotation speed of the motor controlled by the master driver. A curve 332 represents the rotation speed of the motor controlled by the slave driver. The motors have slips, which mean the curve 331 may not be exactly equal to the curve 321. The motor (i.e. the curve 331) is progressively following the target speed indicated by the driving signal (i.e. the curve 321) after the driving signal (i.e. the curve 321) is provided. Similarly, the curve 332 may not be exactly equal to the curve 322. In other words, the driving signal may not be matched with the speed of the motor due to the control delay of the slip. In the embodiment, the master driver compares the DC voltage $V_{dc}$ (i.e. the curve 310) with a set level to generate a comparison result and output deceleration compensation according to the comparison result. When the master driver adjusts the frequency of the driving signal (i.e. curve 321) to decelerate the corresponding motor, this motor is transformed into the generator mode to generate electrical energy which is transmitted back and stored in the energy storage unit of the master driver. Accordingly, the DC voltage $V_{dc}$ (i.e. curve 310) is maintained at the set level so that the power is not consumed too quickly. When the power supply is in the abnormal state or the power-off state, power is continuously provided to the motor drivers through the common-DC-bus structure, and the kinetic energy of the motors can be consumed faster so that the motors can be controlled to stop faster. The motors may be controlled by the motor drivers based on the electrical energy which is generated by the DEB function and stored in the master driver until the motors are decelerated to stop at the same time. In other words, the DEB function is a boost type DEB. In particular, the frequencies of the two driving signals (i.e. curves 321 and 322) is decreasing together and the ratio is maintained during decreasing, and thus the rotation speeds of the two motors (curves 331 and 332) would decrease together with maintained ratio along with the driving signals (i.e. curves 321 and 322) until all the motors are decelerated to stop at the same time.

Figure 4:
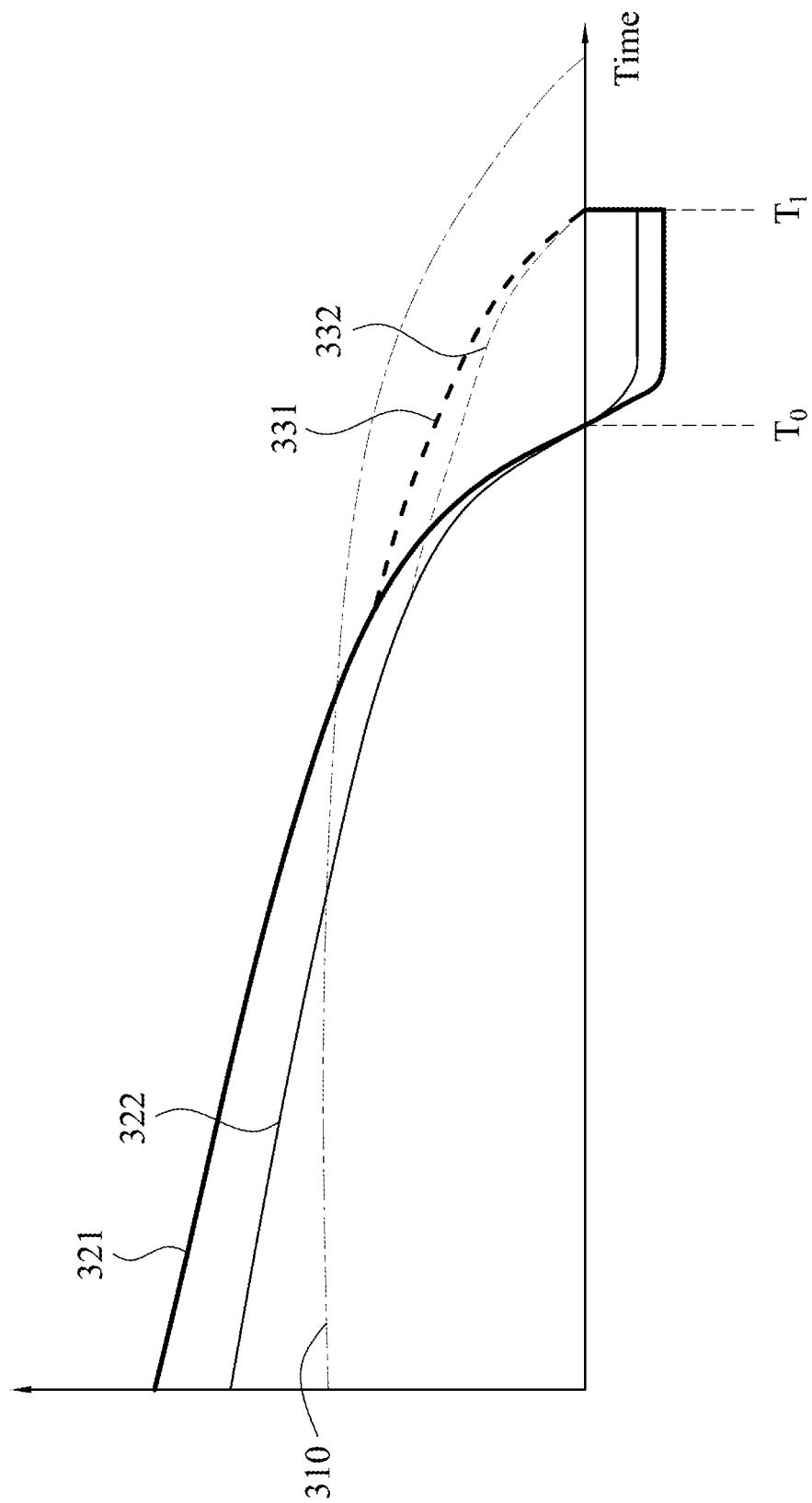
FIG. 4 is a diagram illustrating decreasing speeds of motors when the power supply is in an abnormal state in accordance with another embodiment.

In some embodiments, the master driver obtains speed feedback from the motors. If the frequencies of the driving signals are decreased to zero and the rotation speeds of the motors are not equal to zero, then the master driver changes phases of the driving signals such that the motors generate reverse torques as additional braking force to continuously provide the DEB function for supplying power until the motors are decelerated to stop. The motor of the slave driver also generates reverse torques due to the change of phases with a maintained ratio. The means of changing phases are, for example, switching two phases of a three-phase signal to change the direction the magnetic field rotates, thereby generating a torque in the opposite direction. In detail, referring to FIG. 4 which is a diagram illustrating decreasing speeds of motors when the power supply is in an abnormal state in accordance with another embodiment. At a time point $T_0$, the frequencies of the driving signals (i.e. curves 321 and 322) of the master driver and the slave driver are both equal to zero and the speed of the corresponding motors (i.e. the curves 331 and 332) are not equal to zero, at this moment the master driver changes the phases of the driving signals (i.e. the curve 321) so that the corresponding motor generates reverse torque (represented as negative frequency) to produce a brake-like effect. Accordingly, the master driver continuously activates the DEB function to provide the power needed by itself and the slave driver. Similarly, the slave driver also changes phases of the corresponding driving signal (i.e. curve 322) so that the corresponding motor generates reverse torque while the ratio between the frequency of the driving signal (i.e. curve 321) outputted by the master driver and the frequency of the driving signal (i.e. 322) outputted by the slave driver is maintained at a curtain vale until the time point $T_1$ at which the speeds (i.e. curve 331 and 332) of the motors are decelerated to zero at the same time. In other words, in the embodiment, when the frequencies of the driving signals are equal to zero and the motors do not stop yet (i.e. the speed is not equal to zero), the master driver still provides the driving signals with reversed phases to sustain the DEB function as well as obtaining additional braking force. Accordingly, the energy is maintained for continuously outputting the driving signals so that the speeds of the motors follow the driving signals and the motors are controlled to stop at the same time.

In the aforementioned embodiments, the motor driving system 100 is applied to the textile machine 200, but the motor driving system 100 may be applied to other devices, systems or platforms. For example, the motor driving system 100 may be applied to a transportation cart which has a front-wheel motor and a rear-wheel motor. The motor driving system 100 can stop these two motors at the same time.

Figure 5:
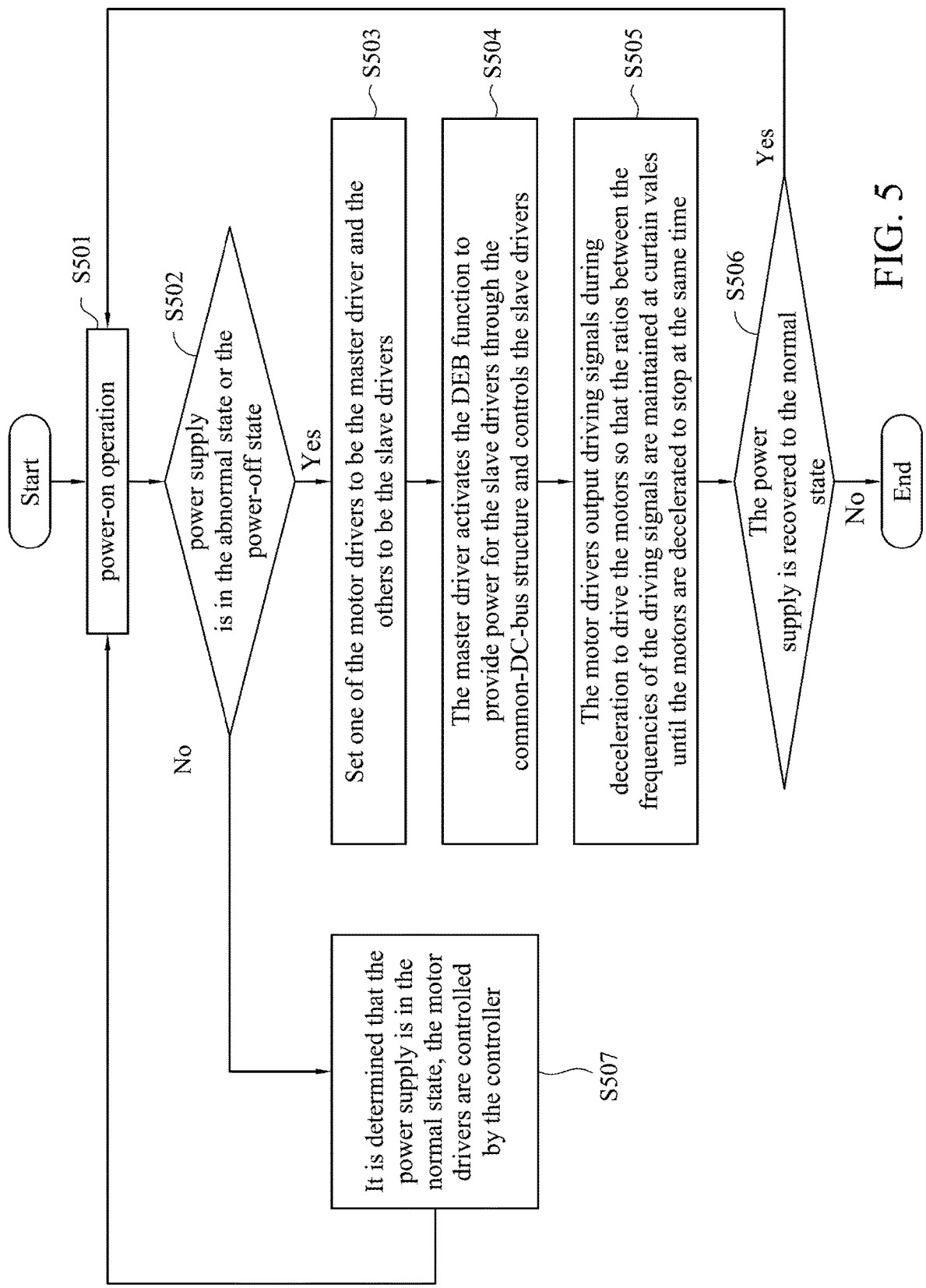
FIG. 5 is a flow chart of a motor driving method in accordance with an embodiment.

FIG. 5 is a flow chart of a motor driving method in accordance with an embodiment. Referring to FIG. 1 and FIG. 5, the method is applied to the motor driving system 100 including the controller 130, the motors 111-113 and the motor drivers 121-123. In step S501, the motor driving system 100 performs a power-on operation, and the external power supply 140 provides power to the motor drivers 121-123 and the controller 130 of the motor driving system 100.

In step S502, it is determined, by the controller 130 or one of the motor drivers 121-123, if the power supply 140 is in the abnormal state or the power-off state. In some embodiment, it is determined if the power supply 140 can normally supply power to the motor driving system 100. If the power supply 140 can normally or stably supply power, then it is determined to be in the normal state. If the power supply 140 is abnormal, unstable or power-off, then it is determined to be in the abnormal state or power-off state. If it is determined that the power supply 140 is in the abnormal state or the power-off state in the step S502, then a step S503 is performed.

In the step S503 in which the power supply 140 is in the abnormal state, the motor drivers 121-123 coordinate with each other to set one of the motor drivers 121-123 to be the master driver and the others are set to be the slave drivers. In the embodiment, the first motor driver 121 is set to be the master driver, and the second motor driver 122 and the third motor driver 123 are set to be the slave drivers.

In step S504, the master driver 121 activates the DEB function to provide power for the slave drivers 122 and 123 through the common-DC-bus structure and controls the slave drivers 122 and 123 such that the ratio between the driving signals DS1-DS3 outputted by the motor drivers 121-123 is maintained at a curtain value until the motors 111-113 are decelerated to stop at the same time. During the deceleration, the master driver 121 compares the DC voltage $V_{dc}$ of the common-DC-bus structure with a set level to generate a comparison result, and adjusts the frequency of the driving signal DS1 according to the comparison result to maintain the DC voltage $V_{dc}$ at the set level and extend the usage time of the renewable energy.

In step S505, the master driver controls itself and the slave drivers during deceleration to output driving signals to drive the motors so that the ratios between the frequencies of the driving signal DS1 outputted by the master driver 121 and the driving signals DS2 and DS3 outputted by the slave drivers 122 and 123 are maintained at curtain vales. For example, the ratio between the frequencies of the first driving signal DS1 and the second driving signal DS2 is maintained at a first ratio (e.g. 1:0.8), and the ratio between the frequencies of the first driving signal DS1 and the third driving signal DS3 is maintained at a second ratio (e.g. 1:0.6). The motor drivers 121-123 provide the driving signals DS1-DS3 during deceleration to control the motors 111-113 to follow the driving signals DS1-DS3 to be decelerated to stop at the same time.

As mentioned above, if the frequencies of the driving signals DS1-DS3 are equal to zero and the speeds of the motors 111-113 are not equal to zero (i.e. the motors have not stopped yet), the master driver 121 change phases of the first driving signal DS1 so that the first motor 111 generates reverse torque to provide additional braking force while the DEB function of the master driver 121 is sustained to supply power until the speed of the first motor 111 is equal to zero. The means of changing phases of the driving signal are, for example, switching two phases of the three-phase signal in order to change the direction the magnetic field rotates, resulting in the torque in the opposite direction. Similarly, the slave drivers 122 and 123 also change phases of the second driving signal DS2 and the third driving signal DS3 respectively so that the second motor 112 and the third motor 113 generate reverse torques along with the operation of the master driver 121. The ratios between the driving signals DS1-DS3 are still maintained at the first ratio (e.g. 1:0.8) and second ratio (e.g. 1:0.6) along with the variation of the first driving signal DS1.

For example, if the frequency of the first driving signal DS1 outputted by the master driver 121 is changed from 100 Hz to 90 Hz, then the frequencies of the second driving signal DS2 and the third driving signal DS3 will be changed from 80 Hz to 72 Hz (i.e. 90 Hz*0.8) and from 60 Hz to 54 Hz (i.e. 90 Hz*0.6) respectively. In this case, the first motor 111, the second motor 112, and the third motor 113 follow the driving signals DS1, DS2 and DS3 to be decelerated and eventually stop at the same time (the speeds of the motors are 0 rpm). The relationship between the frequency of the driving signal and the speed of the motor is related to the number of poles of the motor. Take a 4-poles motor as an example, 1 Hz=30 rpm; 1 Hz=20 rpm for a 6-poles motor; 1 Hz=15 rpm for an 8-poles motor; and 1 Hz=10 rpm for a 12-poles motor.

In step S506, the master driver determines if the power supply 140 is recovered to the normal state. If the determination result is affirmative, it goes back to the power-on operation of the step S501 to restart a control process. If the determination result is no, then the process is ended, power is off, and waiting for follow-up human disposal.

If the determination result of the step S502 indicates that the power supply 140 is in the normal state, then in the step S507, the motor drivers 121-123 are controlled by the controller 130 and it goes back to the power-on operation of the step S501 to restart the control process.

However, all the steps in FIG. 5 have been described in detail above, and therefore the description will not be repeated. Note that the steps in FIG. 5 can be implemented as program codes or circuits, and the disclosure is not limited thereto. In addition, the method in FIG. 5 can be performed with the aforementioned embodiments, or can be performed independently. In other words, other steps may be inserted between the steps of the FIG. 5.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A motor driving system, comprising:
   a controller;
   a plurality of motors; and
   a plurality of motor drivers, outputting a plurality of driving signals to drive the plurality of motors correspondingly and respectively, wherein the motor drivers form a common-DC-bus structure,
   wherein when a power supply is in a normal supplying state, the controller controls the plurality of motor drivers; and
   when the power supply is in an abnormal state or a power-off state, one of the plurality of motor drivers is set to be a master driver and others of the plurality of motor drivers are set to be slave drivers, and the master driver activates a deceleration energy backup function to power and control the slave drivers through the common-DC-bus structure and maintain a ratio between frequencies of the driving signals during deceleration until the plurality of motors are decelerated to stop at the same time,
   wherein when the frequencies of the plurality of driving signals are all equal to zero and speeds of the plurality of motors are not equal to zero, the master driver is configured to change phases of the plurality of driving signals such that the motors generate reverse torques until the plurality of motors are decelerated to stop.

2. The motor driving system of claim 1, wherein not all of a plurality of system inertia driven by the motor drivers are completely identical to each other, and one of the motor drivers that drives a maximum system inertia of the plurality of system inertia is set to be the master driver.

3. The motor driving system of claim 2, wherein each of the plurality of system inertia comprises a rotational inertia of corresponding one of the motors and an inertial of a load connected to the corresponding one of the motors.

4. The motor driving system of claim 1, wherein each of the motor drivers comprises:
   a rectifier unit, electrically connected to the power supply;
   an energy storage unit, electrically connected to an output side of the rectifier unit; and
   an inverter unit, electrically connected between the energy storage unit and corresponding one of the plurality of motors,
   wherein the common-DC-bus structure is formed between the energy storage unit and the inverter unit in each of the plurality of motor drivers.

5. The motor driving system of claim 4, wherein the master driver is configured to decrease the frequency of the corresponding driving signal such that the corresponding motor is transformed into a generator mode to convert its kinetic energy into electrical energy which is transmitted back to the energy storage unit through the inverter unit of the master driver, and accordingly a direct current (DC) voltage of the common-DC-bus structure is increased,
   wherein when the electrical energy is consumed to reduce the DC voltage, the master driver is configured to decrease the frequency of the corresponding driving signal again, and repeats this operation until the corresponding motor is decelerated to stop.

6. A motor driving method for a motor driving system comprising a plurality of motors and a plurality of motor drivers, the motor driving method comprising:
   performing a power-on operation;
   determining if a power supply is in an abnormal state or a power-off state;
   setting one of the plurality of motor drivers to be a master driver and others of the plurality of motor drivers to be slave drivers when determining that the power supply is in the abnormal state or the power-off state;
   activating, by the master driver, a deceleration energy backup function to power and control the slave drivers through a common-DC-bus structure;
   outputting, by the plurality of motor drivers, a plurality of driving signals to control the motors respectively, wherein a ratio between frequencies of the plurality of driving signals is maintained during deceleration until the plurality of motors are decelerated to stop at the same time; and
   when the frequencies of the plurality of driving signals are all equal to zero and speeds of the plurality of motors are not equal to zero, changing phases of the plurality of driving signals such that the motors generate reverse torques until the plurality of motors are decelerated to stop.

7. The motor driving method of claim 6, further comprising:
   comparing, by the master driver, a direct current (DC) voltage of the common-DC-bus structure with a set level to generate a comparison result, and adjusting the frequency of the corresponding driving signal according to the comparison result to maintain the DV voltage at the set level.

8. The motor driving method of claim 6, further comprising:
   determining, by the master driver, if the power supply is in a normal supplying state when the motors are decelerated to stop;
   going back to the power-on operation if the power supply is in the normal supplying state; and
   ending a process if the power supply is not in the normal supplying state.

9. The motor driving method of claim 6, further comprising:
   controlling, by a controller, the plurality of motor drivers when determining that the power supply is in a normal supplying state.

* * * * *